US011924459B2

(12) United States Patent
Huo et al.

(10) Patent No.: US 11,924,459 B2
(45) Date of Patent: Mar. 5, 2024

(54) METHOD FOR INTER PREDICTION METHOD, VIDEO PICTURE ENCODER AND DECODER

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN); Shuai Wan, Dongguan (CN); Wei Zhang, Dongguan (CN); Fuzheng Yang, Dongguan (CN); Qihong Ran, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/453,049

(22) Filed: Nov. 1, 2021

(65) Prior Publication Data
US 2022/0053211 A1    Feb. 17, 2022

Related U.S. Application Data

(63) Continuation of application No. PCT/CN2019/107615, filed on Sep. 24, 2019.

(51) Int. Cl.
| *H04N 19/52* | (2014.01) |
| *H04N 19/109* | (2014.01) |
| *H04N 19/139* | (2014.01) |
| *H04N 19/176* | (2014.01) |
| *H04N 19/184* | (2014.01) |

(52) U.S. Cl.
CPC .......... *H04N 19/52* (2014.11); *H04N 19/109* (2014.11); *H04N 19/139* (2014.11); *H04N 19/176* (2014.11); *H04N 19/184* (2014.11)

(58) Field of Classification Search
None
See application file for complete search history.

(56) References Cited

U.S. PATENT DOCUMENTS

| 2010/0290530 A1 | 11/2010 | Huang |
| 2011/0013697 A1 | 1/2011 | Choi |

(Continued)

FOREIGN PATENT DOCUMENTS

| CN | 1585487 A | 2/2005 |
| CN | 1885948 A | 12/2006 |

(Continued)

OTHER PUBLICATIONS

International Search Report in the international application No. PCT/CN2019/107615, dated Jun. 23, 2020.

(Continued)

*Primary Examiner* — Lindsay J Uhl
(74) *Attorney, Agent, or Firm* — PERKINS COIE LLP

(57) ABSTRACT

A method and apparatus for inter prediction. According to the position of a current block in a video picture, first motion information and second candidate motion information is determined, the motion information at least includes a motion vector; it is determined whether the distance between the motion vector of the first motion information and the motion vector of the second candidate motion information is greater than a first threshold; if the determination result is that the distance is less than or equal to the first threshold, the second candidate motion information is updated to obtain second motion information; if the determination result is that the distance is greater than the first threshold, the second candidate motion information is taken as the second motion information; and inter prediction is performed on the current block by using the first motion information and the second motion information.

16 Claims, 10 Drawing Sheets

(56) References Cited

U.S. PATENT DOCUMENTS

| | | | | |
|---|---|---|---|---|
| 2011/0194609 A1* | 8/2011 | Rusert | ............... | H04N 19/176 |
| | | | | 375/E7.243 |
| 2013/0301727 A1* | 11/2013 | Huang | ............... | H04N 19/50 |
| | | | | 375/240.16 |
| 2015/0181230 A1* | 6/2015 | Son | ............... | H04N 19/573 |
| | | | | 375/240.15 |
| 2021/0344969 A1* | 11/2021 | Zhang | ............... | H04N 19/184 |
| 2021/0392336 A1* | 12/2021 | Tamse | ............... | H04N 19/137 |
| 2022/0078408 A1* | 3/2022 | Park | ............... | H04N 19/139 |

FOREIGN PATENT DOCUMENTS

| | | |
|---|---|---|
| CN | 101827269 A | 9/2010 |
| CN | 102474619 A | 5/2012 |
| CN | 102547258 A | 7/2012 |
| CN | 109922336 A | 6/2019 |
| CN | 110149512 A | 8/2019 |
| CN | 110213590 A | 9/2019 |
| CN | 113498608 A | 10/2021 |
| JP | 2002101416 A | 4/2002 |
| JP | 2015520581 A | 7/2015 |
| JP | 2017005763 A | 1/2017 |
| JP | 2020145650 A | 9/2020 |
| KR | 20130050903 A | 5/2013 |
| WO | 2017048008 A1 | 3/2017 |
| WO | 2019049912 A1 | 3/2019 |

OTHER PUBLICATIONS

Office Action of the Indian application No. 202117048375, dated Apr. 27, 2022. 5 pages with English translation.

ISO "Test Model of Essential Video Coding (ETM3.0)", 127. MPEG Meeting; Jul. 8, 2019-Jul. 12, 2019; Gothenburg; (MPEP ISO/IEC JTC1/SC29/WG11), No. n18569, Aug. 8, 2019 (Aug. 8, 2019), XP030206782. 23 pages.

Seungsoo Jeong et al: "CE4 Ultimate motion vector expression in JVET-J0024 (Test 4.2.9)", JVET of ISO/IEC JTC1/SC29/WG11 and ITU-T SG. 16, No. JVET-K0115_v4; JVET-K0115, Jul. 12, 2018, 7 pages.

Supplementary European Search Report in the European application No. 19947334.9, dated Jul. 4, 2022. 7 pages.

Written Opinion of the International Search Authority in the international application No. PCT/CN2019/107615, dated Jun. 23, 2020. 9 pages with English translation.

Lin Qi, et al. "Fast Inter Prediction Algorithm for AVS2" «Video Engineering» vol. 38, No. 17, Sep. 2, 2014. 6 pages.

First Office Action of the Chinese application No. 202111228352.9, dated Sep. 21, 2022. 13 pages with English translation.

First Office Action of the European application No. 19947334.9, dated Mar. 20, 2023. 6 pages.

Li (Tencent) G et al: "CE4-related: Fix of MMVD signalling". 126. MPEG Meeting; Mar. 25, 2019-Mar. 29, 2019; Geneva; (Motion Picture Expert Group or ISO/IEC JTC1/SC29/WG11), No. m47041, Mar. 19, 2019 (Mar. 19, 2019), XP030210437, the whole document, 3 pages.

Second Office Action of the European application No. 19947334.9, dated Sep. 29, 2023, 7 pages.

First Office Action of the Japanese application No. 2021-578097, dated Oct. 3, 2023, 8 pages with English translation.

First Office Action of the Indonesian application No. P00202110474, dated Dec. 8, 2023, 5 pages with English translation.

* cited by examiner

METHOD FOR INTER PREDICTION METHOD, VIDEO PICTURE ENCODER AND DECODER

CROSS REFERENCE TO RELATED APPLICATION

This is a continuation of International Application No. PCT/CN2019/107615, filed on Sep. 24, 2019, and entitled "INTER-FRAME PREDICTION METHOD AND APPARATUS, DEVICE AND STORAGE MEDIUM", the disclosure of which is hereby incorporated by reference in its entirety.

TECHNICAL FIELD

Embodiments of the present disclosure relate to electronic technologies, and relate to, but are not limited to, a method, apparatus and device for inter prediction, and a storage medium.

BACKGROUND

In the Versatile Video Coding (VVC) standard, the Merge mode with Motion Vector Difference (MMVD) (called MMVD for short) technology is added. The technology is applied to a Skip mode and a Merge mode in inter prediction, and is a special expression form of a motion vector.

When the number of pieces of candidate motion information in an ordinary Merge mode is greater than 1, the first two pieces of candidate motion information in a Merge candidate list are taken as MMVD candidate motion information. The motion information may include: a motion vector, a reference picture index, and a reference picture list index. The motion vector is expanded by taking the motion vector in each piece of MMVD candidate motion information as a starting point, to obtain a plurality of expanded motion vectors. Then inter prediction is performed on the current block in video data according to each starting point and the reference picture index and reference picture list index corresponding to the starting point, and each expanded motion vector and the reference picture index and reference picture index corresponding to the expanded motion vector.

However, in practical applications, it is found that poor coding/decoding efficiency is sometimes achieved by the above-mentioned method for inter prediction based on the MMVD.

DETAILED DESCRIPTION

Figure 1:
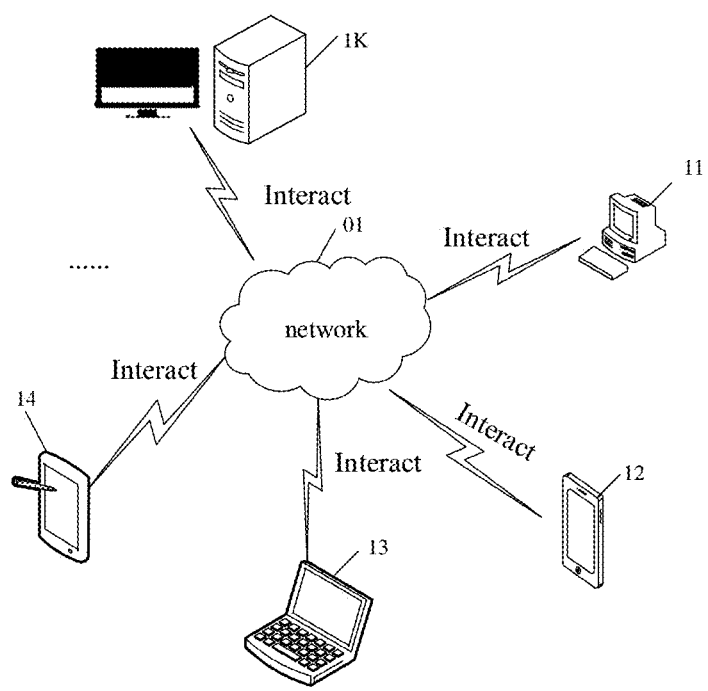
FIG. 1 is a schematic diagram of a composition structure of a network architecture according to embodiments of the present disclosure.

To make the purposes, technical solutions, and advantages of the embodiments of the present disclosure clearer, specific technical solutions of the present disclosure will be further described in detail with reference to the accompanying drawings in the embodiments of the present disclosure. The following embodiments are used to describe the present disclosure rather than limiting the scope of the present disclosure.

Unless otherwise defined, all technical and scientific terms used herein shall have the same meanings as commonly understood by those skilled in the art to which this application belongs. The terms used herein are only intended to describe the embodiments of the present disclosure, and are not intended to limit the present disclosure.

"Some embodiments" involved in the following descriptions describes a subset of all possible embodiments. However, it can be understood that "some embodiments" may be the same subset or different subsets of all the possible embodiments, and may be combined without conflicts.

It is to be pointed out that term "first/second/third" involved in the embodiments of the present disclosure is only for distinguishing similar objects and does not represent a specific sequence of the objects. It can be understood that "first/second/third" may be interchanged to specific sequences or orders if allowed to implement the embodiments of the present disclosure described herein in sequences except the illustrated or described ones.

Embodiments of the present disclosure provide a method, apparatus and device for inter prediction and a storage medium. Technical solutions of the embodiments of the present disclosure are implemented as follows.

In a first aspect, the embodiments of the present disclosure provide a method for inter prediction, which may be applied to a video picture encoder, and may include: first motion information and second candidate motion information are determined according to the position of a current block in a video picture, the motion information at least including motion vectors; whether the distance between the motion vector of the first motion information and the motion vector of the second candidate motion information is greater than a first threshold value is judged; when a judgment result indicates that the distance is less than or equal to the first threshold value, the second candidate motion information is updated to obtain second motion information; when the judgment result indicates that the distance is greater than the first threshold value, the second candidate motion information is taken as the second motion information; and inter prediction is performed on the current block by using the first motion information and the second motion information.

In a second aspect, the embodiments of the present disclosure provide a method for inter prediction, which may be applied to decoding a video picture bitstream, and may include: a bitstream is parsed to obtain the position of the current block in a video picture; first motion information and second candidate motion information are determined according to the position, the motion information at least including motion vectors; whether the distance between the motion vector of the first motion information and the motion vector of the second candidate motion information is greater than a first threshold value is judged; when a judgment result indicates that the distance is less than or equal to the first threshold value, the second candidate motion information is updated to obtain second motion information; when the judgment result indicates that the distance is greater than the first threshold value, the second candidate motion information is taken as the second motion information; and an inter prediction value of the current lock is constructed by using the first motion information and the second motion information.

In a third aspect, the embodiments of the present disclosure provide an apparatus for inter prediction, which may include: a first determination module, configured to determine first motion information and second candidate motion information according to the position of a current block in a video picture, the motion information at least including motion vectors; a first judgment module, configured to judge whether the distance between the motion vector of the first motion information and the motion vector of the second candidate motion information is greater than a first threshold value; when a judgment result indicates that the distance is less than or equal to the first threshold value, update the second candidate motion information to obtain second motion information, and when the judgment result indicates that the distance is greater than the first threshold value, take the second candidate motion information as the second motion information; and a first prediction module, configured to perform inter prediction on the current block by using the first motion information and the second motion information.

In a fourth aspect, the embodiments of the present disclosure provide an apparatus for inter prediction, which may include: a parsing module, configured to parse a bitstream to obtain the position of the current block in a video picture; a second determination module, configured to determine first motion information and second candidate motion information according to the position; a second judgment module, configured to judge whether the distance between the motion vector of the first motion information and the motion vector of the second candidate motion information is greater than a first threshold value, when a judgment result indicates that the distance is less than or equal to the first threshold value, update the second candidate motion information to obtain second motion information, and when the judgment result indicates that the distance is greater than the first threshold value, take the second candidate motion information as the second motion information; and a second prediction module, configured to: construct an inter prediction value of the current block by using the first motion information and the second motion information.

In a fifth aspect, the embodiments of the present disclosure provide an electronic device, which may include a memory and a processor. The memory stores a computer program which is runnable on the processor. The processor implements steps in the method for inter prediction of the embodiments of the present disclosure when executing the program, or implements the steps in the method for inter prediction in the embodiments of the present disclosure when executing the program.

In the sixth aspect, the embodiments of the present disclosure provide a computer readable storage medium, which stores a computer program. Steps in the method for inter prediction of the embodiments of the present disclosure are implemented when the computer program is executed by the processor, or steps in the method for inter prediction of the embodiments of the present disclosure are implemented when the program is executed.

In the embodiments of the present disclosure, after the first motion information and the second candidate motion information are determined according to the position of the current block in the video picture, inter prediction on the current block by using the motion information is not performed directly, but it is firstly judged whether the second candidate motion information satisfies a condition first before performing the inter prediction, i.e., it is judged whether the distance between the motion vector of the first motion information and the motion vector of the second candidate motion information is greater than the a first threshold value. The second candidate motion information is updated when the judgment result indicates that the distance is less than or equal to the first threshold, so as to obtain the second motion information. The second candidate motion information is taken as the second motion information when the judgment result indicates that the distance is greater than the first threshold value. Based on this, the inter prediction is performed by using the first motion information and the second motion information. Thus, the coding performance can be improved with the operation times basically unchanged.

The embodiment provides a network architecture first. FIG. 1 is a schematic structural diagram of the network architecture of the embodiment of the present disclosure. As shown in FIG. 1, the network architecture includes one or more electronic devices 11 to 1K and a communication network 01. The electronic devices 11 to 1K may perform video interaction through the communication network 01. The electronic device can be various types of devices with video coding and decoding functions in an implementation process, and for example, the electronic device may include a mobile phone, a tablet computer, a personal computer, a television, a server, etc.

Figure 2A:
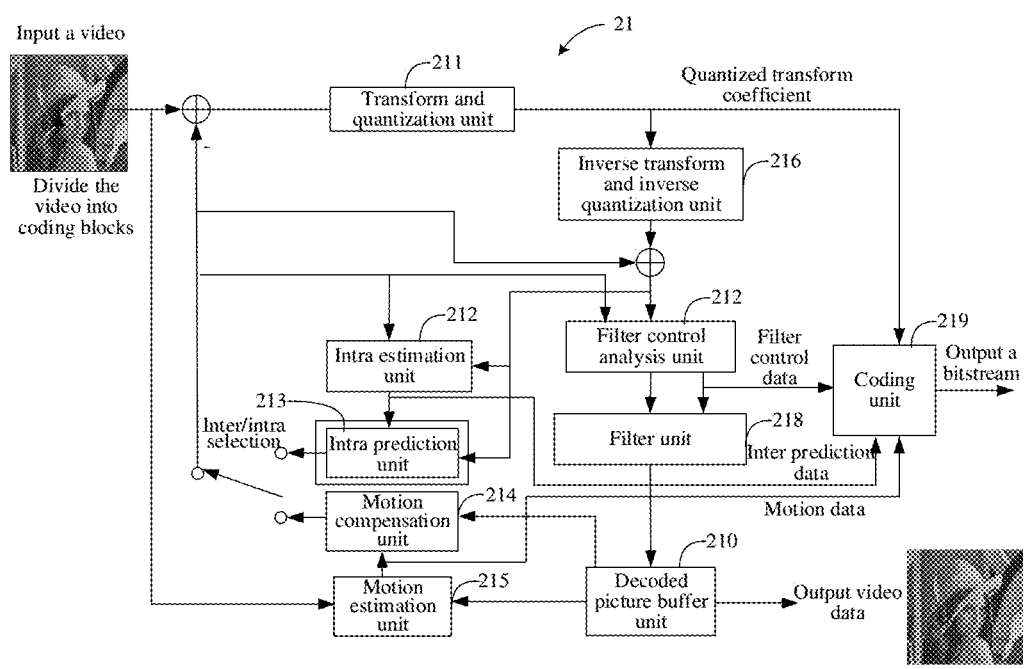
FIG. 2A is a schematic structural diagram of a video picture encoder according to the embodiments of the present disclosure.

The electronic device has a video coding and decoding function and includes a video picture encoder and/or a video picture decoder. For example, as shown in FIG. 2A, the composition structures of video picture encoder 21 include: a transform and quantization unit 211, an intra estimation unit 212, an inter prediction unit 213, a motion compensation unit 214, a motion estimation unit 215, an inverse transform and inverse quantization unit 216, a filter control analysis unit 217, a filter unit 218, a coding unit 219, a decoded picture buffer unit 210, etc. The filter unit 218 may implement deblocking filtering and Sample Adaptive Offset (SAO) filtering. The coding unit 219 may implement header information coding and Context-based Adaptive Binary Arithmetic Coding (CABAC).

For input source video data, a video coding block may be obtained through the division of a Coding Tree Unit (CTU), and then the video coding block is transformed by the transform and quantization unit 211 for the residual pixel information obtained after intra or inter prediction, including transforming the residual information from a pixel domain to a transform domain, and quantizing an obtained transform coefficient, so as to further reduce a bit rate. The intra estimation unit 212 and the intra prediction unit 213 are configured to perform intra prediction on the video coding block. The intra estimation unit 212 and the intra prediction unit 213 are configured to determine an intra prediction mode to be used to code the video coding block. The motion compensation unit 214 and the motion estimation unit 215 are configured to perform inter prediction coding of the received video coding block relative to one or more blocks in one or more reference pictures to provide time prediction information. Motion estimation performed by the motion estimation unit 215 is a process of generating motion vectors, which can be used to estimate the motion of the video coding block, and then the motion compensation unit 214 executes motion compensation on the basis of the motion vectors determined by the motion estimation unit 215. After an intra prediction mode is determined, the intra prediction unit 213 is further configured to provide the selected intra prediction data to the coding unit 219, and the motion estimation unit 215 also transmits the calculated and determined motion vector data to the coding unit 219. In addition, the inverse transform and inverse quantization unit 216 is configured to reconstruct the video coding block, so as to reconstruct a residual block in the pixel domain. Blocking effect artifacts of the reconstructed residual block are removed by the filter control analysis unit 217 and the filter unit 218, and then the reconstructed residual block is added to a predictive block in a picture of the decoded picture buffer unit 210 to generate a reconstructed video coding block. The coding unit 219 is configured to code various coding parameter values and quantized transform coefficients. In a CABAC-based coding algorithm, context may be based on adjacent coding blocks, and the coding unit 219 may be configured to code information indicating the determined intra prediction mode, and output a bitstream of the source video data. The decoded picture buffer unit 210 is configured to store the reconstructed video coding block for prediction reference. With the progress of the video picture coding, new reconstructed video coding blocks may be continuously generated, and these reconstructed video coding blocks are all stored in the decoded picture buffer unit 210.

Figure 2B:
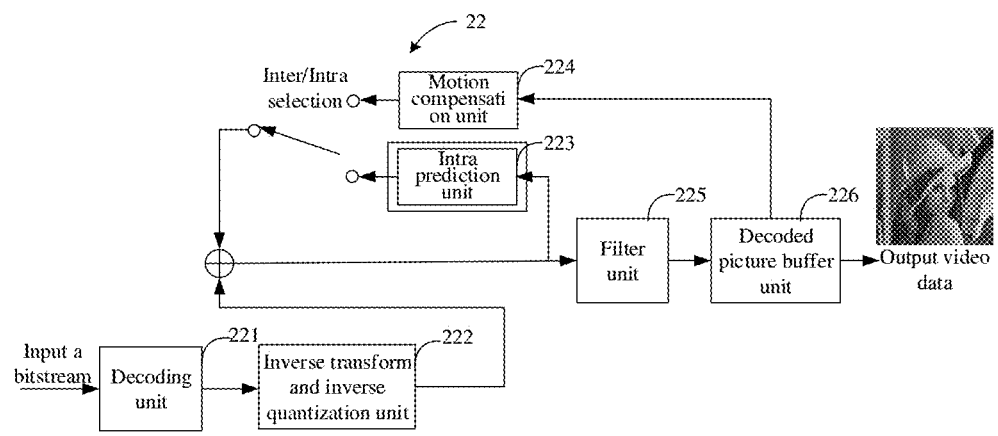
FIG. 2B is a schematic structural diagram of the video picture encoder according to the embodiments of the present disclosure.

The composition structure of a video picture decoder 22 corresponding to the video picture encoder 21, as shown in FIG. 2B, includes: a decoding unit 221, an inverse transform and inverse quantization unit 222, an intra prediction unit 223, a motion compensation unit 224, a filter unit 225, a decoded picture buffer unit 226, etc. The decoding unit 221 may implement header information decoding and CABAC decoding, and the filter unit 225 may implement deblocking filtering and SAO filtering. A bitstream of the source video data is output after the input source video data is subjected to coding processing of FIG. 2A. The bitstream is input into the video picture decoder 22 and firstly passes through the decoding unit 221 to obtain a decoded transform coefficient. The transform coefficient is processed by the inverse transform and inverse quantization unit 222, so as to generate a residual block in the pixel domain. The intra prediction unit 223 may be configured to generate prediction data for a current video decoding block on the basis of the determined intra prediction mode and the data of a previous decoded block from the current frame or picture. The motion compensation unit 224 is configured to determine prediction information for a video decoding block by parsing motion vectors and other associated syntax elements, and use the prediction information to generate a predictive block of the video decoding block being decoded. A decoded video block is formed by summing the residual block from the inverse transform and inverse quantization unit 222 and the corresponding predictive block generated by the intra prediction unit 223 or the motion compensation unit 224. The obtained decoded video data is processed by the filter unit 225 to remove blocking effect artifacts, which may improve the video quality. Then the decoded video data is then stored in a decoded picture buffer unit 226. The decoded picture buffer unit 226 is configured to store reference pictures for subsequent intra prediction or motion compensation, and meanwhile, is configured to output the video data.

The embodiments of the present disclosure are illustrated below in detail with reference to accompanying drawings and embodiments. The method for inter prediction provided by the embodiments of the present disclosure may be applied to either the video picture encoder 21, or may be applied to the video picture decoder 22, which is not specifically limited by the embodiments of the present disclosure.

The embodiments of the present disclosure provide a method for inter prediction. The method is applied to a video picture encoder 21 of an electronic device. The functions realized by the method may be realized by calling program codes by a processor in the electronic device. Of course, the program codes may be stored in the computer storage medium. It can be seen that the electronic device at least includes the processor and a storage medium.

Figure 3:
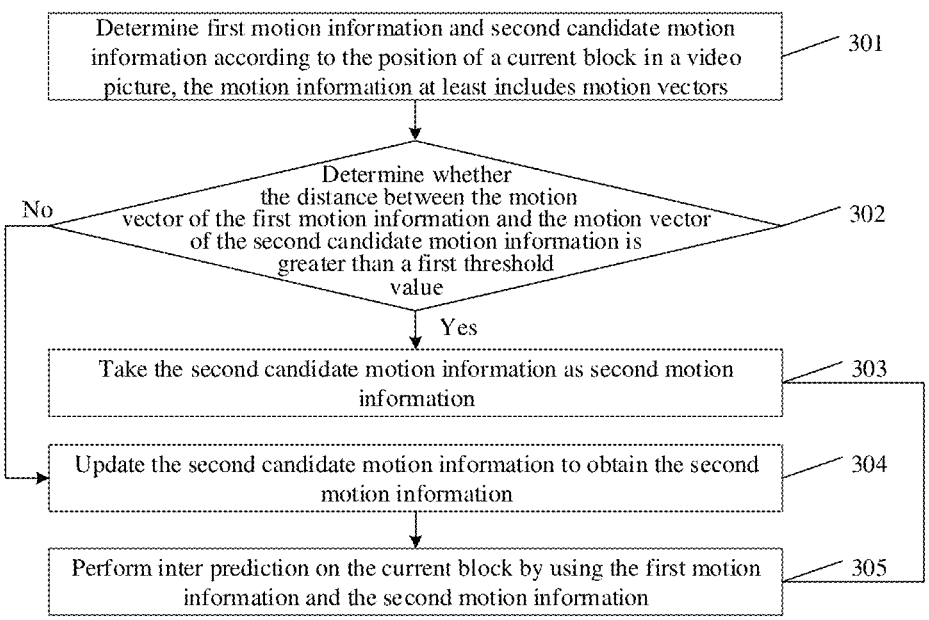
FIG. 3 is an implementation flowchart of a method for inter prediction according to the embodiments of the present disclosure.

FIG. 3 is an implementation flowchart of a method for inter prediction according to the embodiments of the present disclosure. As shown in FIG. 3, the method at least includes S301 to S305.

At S301, first motion information and second candidate motion information are determined according to the position of a current block in a video picture. The motion information at least includes motion vectors.

The electronic device may implement S301 through S401 and S402 in the following embodiments.

At S302, whether the distance between the motion vector of the first motion information and the motion vector of the second candidate motion information is greater than a first threshold value is judged. If yes, S303 is executed; and otherwise, S304 is executed.

When S302 is implemented by the electronic device, whether the distance between the position to which the motion vector of the first motion information points and the position to which the motion vector of the second motion information points is greater than a first threshold value. In one example, the electronic device may take the Euclidean distance between the two motion vectors as the distance between the two motion vectors, and the two motion vectors are the motion vector of the first motion information and the motion vector of the second candidate motion information respectively. In another example, the electronic device may take a coordinate difference value of the two motion vectors in the horizontal direction and/or the vertical direction as the distance between the two motion vectors.

At S303, the second candidate motion information is taken as second motion information, and then S305 is executed.

At S304, the second candidate motion information is updated to obtain the second motion information, and then S305 is executed.

There are many methods for the electronic device to implement S304. For example, in one example, the electronic device may take a motion vector, which intersects a first boundary line, in a direction pointing to the motion vector of the second candidate motion information, as a motion vector of the second motion information. The first boundary line is composed of points that take a motion vector pointing point of the first motion information as a center point and have a distance equal to the first threshold value from the center point.

In another example, the electronic device may also take a motion vector pointing to a point having a preset distance from the motion vector of a first candidate motion information as the motion vector of the second motion information. The preset distance may be a ½ pixel or a ¼ pixel.

At S305, inter prediction is performed on the current block by using the first motion information and the second motion information.

When S305 is implemented by the electronic device, according to the position, a first piece of motion information obtained by a preset motion information derivation method may be taken as the first motion information, and a second piece of motion information obtained by the preset motion information derivation method may be taken as the second candidate motion information.

The embodiments of the present disclosure further provide a method for inter prediction, which is applied to a video picture encoder 21 of an electronic device. The method at least includes S401 to S406 as follows.

At S401, a first piece of motion information obtained by a preset motion information derivation method is taken as the first motion information according to the position of the current block in the video picture.

At S402, a second piece of motion information obtained by the preset motion information derivation method is taken as the second candidate motion information. The motion information at least includes motion vectors.

In one example, the preset motion information derivation method is a motion information derivation method for Merge mode.

At S403, whether the distance between the motion vector of the first motion information and the motion vector of the second candidate motion information is greater than a first threshold value is judged. If yes, S404 is executed; and otherwise, S405 is executed.

It is to be noted that a method for determining the first threshold value is not limited in the embodiments of the present disclosure. The first threshold value may be a preset value, or may be a value adaptively determined by the electronic device. When the first threshold value is a preset value, the first threshold value may be a value expressed as a fractional pixel accuracy, for example, the first threshold value is a ½ pixel or a ¼ pixel. When the first threshold value is a value determined adaptively, the electronic device may determine the first threshold value through the following methods. That is, the electronic device calculates correlation parameter values between a plurality of motion vectors of adjacent blocks of the current block, and takes the distance between the motion vector corresponding to one of the correlation parameter values representing the maximum correlation between the two motion vectors as the first threshold value.

At S404, the second candidate motion information is taken as the second motion information, and then S406 is executed.

At S405, the second candidate motion information is updated to obtain the second motion information, and then S406 is executed.

There are many methods for the electronic device to implement S405. For example, it may be implemented by S506 and S506 as described in the following embodiments, or may be implemented by S605 and S606 as described in the following embodiments.

At S406, inter prediction is performed on the current block by using the first motion information and the second motion information.

The embodiments of the present disclosure further provide a method for inter prediction, which is applied to a video picture encoder 21 of an electronic device. The method at least includes S501 to S507 as follows.

At S501, a first piece of motion information obtained by a preset motion information derivation method is taken as the first motion information according to the position of the current block in the video picture.

At S502, a second piece of motion information obtained by the preset motion information derivation method is taken as the second candidate motion information. The motion information at least includes motion vectors.

In one example, the preset motion information derivation method is a motion information derivation method for Merge mode.

At S503, whether the distance between the motion vector of the first motion information and the motion vector of the second candidate motion information is greater than a first threshold value is judged. If yes, S504 is executed; and otherwise, S505 is executed.

At S504, the second candidate motion information is taken as the second motion information, and then S507 is executed.

At S505, derived motion information is continued to be obtained by using the preset motion information derivation method after the second candidate motion information is obtained.

At S506, when the distance between the motion vector of the first motion information and the motion vector of the derived motion information is greater than the first threshold value, the derived motion information is taken as the second motion information, and then S507 is executed.

In other embodiments, when the distance between the motion vector of the first motion information and the motion vector of the derived motion information is less than or equal to the first threshold value, the electronic device continues to execute a step similar to S503 by using the preset motion information derivation method until the second motion information is determined, and then S507 is executed.

At S507, inter prediction is performed on the current block by using the first motion information and the second motion information.

The embodiments of the present disclosure further provide a method for inter prediction, which is applied to a video picture encoder 21 of an electronic device. The method at least includes S601 to S607 as follows.

At S601, a first piece of motion information obtained by a preset motion information derivation method is taken as the first motion information according to the position of the current block in the video picture.

At S602, a second piece of motion information obtained by the preset motion information derivation method is taken as the second candidate motion information. The motion information at least includes motion vectors.

In one example, the preset motion information derivation method is a motion information derivation method for Merge mode.

At S603, whether the distance between the motion vector of the first motion information and the motion vector of the second candidate motion information is greater than a first threshold value is judged. If yes, S604 is executed; and otherwise, S605 is executed.

At S604, the second candidate motion information is taken as the second motion information, and then S607 is executed.

At S605, derived motion information is continued to be obtained by using the preset motion information derivation method after the second candidate motion information is obtained.

At S606, when the distance between the motion vector of the first motion information and the motion vector of any piece of the motion information obtained by the preset motion information derivation method is less than or equal to the first threshold value, the derived motion information is taken as the second motion information, and then S607 is executed.

At S607, inter prediction is performed on the current block by using the first motion information and the second motion information.

The embodiments of the present disclosure further provide a method for inter prediction, which is applied to a video picture encoder 21 of an electronic device. The method at least includes S701 to S707 as follows.

At S701, first motion information and second candidate motion information are determined according to the position of a current block in a video picture. The motion information at least includes motion vectors.

At S702, whether the distance between the motion vector of the first motion information and the motion vector of the second candidate motion information is greater than a first threshold value is judged. If yes, S703 is executed; and otherwise, S704 is executed.

At S703, the second candidate motion information is taken as the second motion information, and then S705 is executed.

At S704, the second candidate motion information is updated to obtain the second motion information, and then S705 is executed.

At S705, optimal motion information is selected from the candidate motion information indicated by the first motion information and the second motion information.

During implementation, the electronic device may determine the candidate motion information indicated by the first motion information and the second motion information by using an MMVD method. In other embodiments, the electronic device may determine the optimal motion information by using a rate distortion optimization method.

At S706, an inter prediction value of the current block is constructed by using the optimal motion information.

At S707, the parameter value for indicating the optimal motion information is coded and is written into a bitstream.

Figure 4:
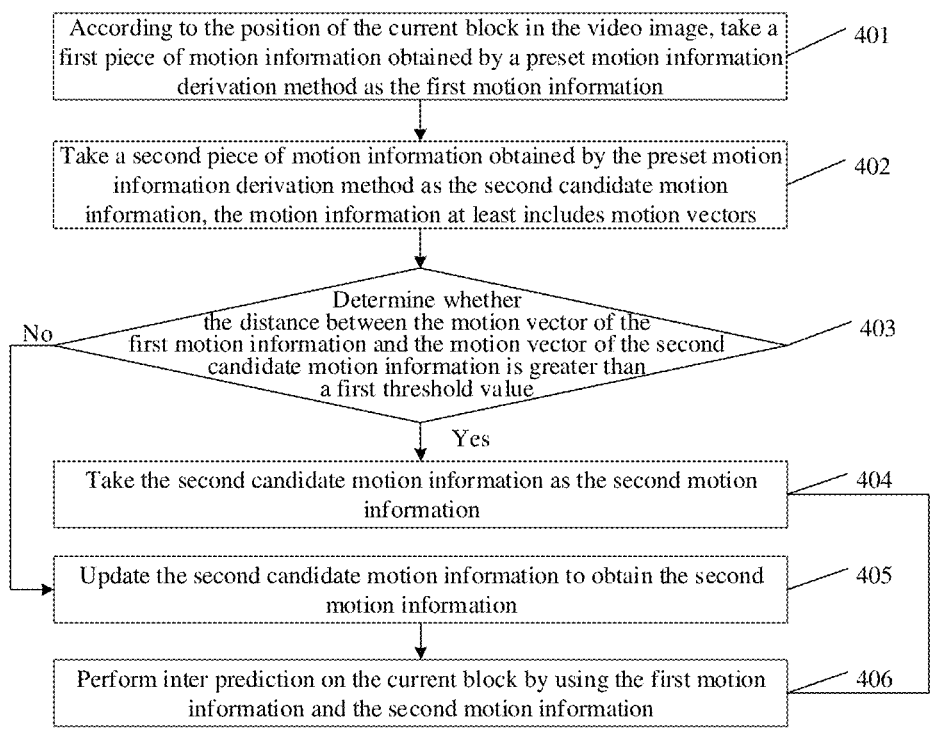
FIG. 4 is an implementation flowchart of another method for inter prediction according to the embodiments of the present disclosure.

The embodiments of the present disclosure further provide a method for inter prediction, which is applied to a video picture decoder 22 of an electronic device. FIG. 4 is an implementation flowchart of the method for inter prediction according to the embodiments of the present disclosure. As shown in FIG. 4, the method at least includes S801 to S806 as follows.

At S801, a bitstream is parsed to obtain the position of a current block in a video picture.

At S802, first motion information and second candidate motion information are determined according to the position of a current block in a video picture. The motion information at least includes motion vectors.

When S802 is implemented by the electronic device, a first piece of motion information obtained by a preset motion information derivation method may be taken as the first motion information according to the position, and a second piece of motion information obtained by the preset motion information derivation method may be taken as the second candidate motion information. In one example, the preset motion information derivation method is a motion information derivation method for Merge mode.

At S803, whether the distance between the motion vector of the first motion information and the motion vector of the second candidate motion information is greater than a first threshold value is judged. If yes, S804 is executed; and otherwise, S805 is executed.

When S803 is implemented by the electronic device, whether the distance between the position to which the motion vector of the first motion information points and the position to which the motion vector of the second motion information points is greater than a first threshold value may be determined. In one example, the electronic device may take the Euclidean distance between the two motion vectors as the distance between the two motion vectors, and the two motion vectors are the motion vector of the first motion information and the motion vector of the second candidate motion information respectively. In another example, the electronic device may take a coordinate difference value of the two motion vectors in the horizontal direction and/or the vertical direction as the distance between the two motion vectors.

It is to be noted that the method for determining the first threshold value is not limited in the embodiments of the present disclosure. The first threshold value may be a preset value, or may be a value adaptively determined by the electronic device. When the first threshold value is a preset value, the first threshold value may be a value represented as a fractional pixel accuracy, for example, the first threshold value is a ½ pixel or a ¼ pixel. When the first threshold value is a value determined adaptively, the electronic device may determine the first threshold value through the following method. That is, the electronic device calculates correlation parameter values between a plurality of motion vectors of adjacent blocks of the current block, and takes the distance between the motion vectors corresponding to one of the correlation parameter values representing the maximum correlation between the two motion vectors as the first threshold value.

At S804, the second candidate motion information is taken as the second motion information, and then S806 is executed.

At S805, the second candidate motion information is updated to obtain the second motion information, and then S806 is executed.

There are many methods for the electronic device to implement S805. In Example 1, the electronic device may continue to use the preset motion information derivation method to obtain derived motion information after obtaining the second candidate motion information. When the distance between the motion vector of the first motion information and the motion vector of the derived motion information is greater than the first threshold value, the derived motion information is taken as the second motion information.

In Example 2, the electronic device may continue to use the preset motion information derivation method to obtain derived motion information after obtaining the second candidate motion information. When the distance between the motion vector of the first motion information and the motion vector of any piece of motion information obtained by the preset motion information derivation method is less than or equal to the first threshold value, a specified piece of derived motion information is taken as the second motion information.

In Example 3, the electronic device may take a motion vector, which intersects a first boundary line, in a direction pointing to the motion vector of the second candidate motion information, as a motion vector of the second motion information. The first boundary line is composed of points that take a motion vector pointing point of the first motion information as a center point and have the distance equal to the first threshold value from the center point.

In Example 4, the electronic device may also take a motion vector pointing to a point having a preset distance from the motion vector of a first candidate motion information as the motion vector of the second motion information.

At S806, an inter prediction value of the current block is constructed by using the first motion information and the second motion information.

When S806 is implemented by the electronic device, a bitstream may be parsed to determine a parameter indicating motion information for constructing an inter prediction value of the current block. A motion vector is selected from the candidate motion information indicated by the first motion information and the second motion information according to parameters of the motion information. A correction amount of the motion vector is calculated according to the parameters of the motion information. The sum of the selected motion vector and the correction amount of the motion vector is taken as the motion vector of the current block. An inter prediction value of the current block is constructed by using the motion vector of the current block.

In one example, the electronic device may determine the candidate motion information indicated by the first motion information and the second motion information by using an MMVD method.

The MMVD technique is applied to a Skip mode and a Merge mode in inter prediction, and is a special expression form of a motion vector. The MMVD technique is mainly implemented through the following processes.

a) MMVD candidate motion information is constructed: when the number of the pieces of the candidate motion information in a Merge candidate list is 1, the candidate motion information is taken as the MMVD candidate motion information; when the number of the pieces of the candidate motion information in the list is greater than 1, first two pieces of candidate motion information in the Merge candidate list are taken as the MMVD candidate motion information. The motion information may include: a motion vector, a reference picture index, and a reference picture list index. One piece of the MMVD candidate motion information is selected as an initial motion vector (called a starting point for short, i.e. a motion vector in the first motion information), and then an expanded motion vector (called a preset point for short) is obtained by expanding through the following method.

b) At a coding end, a video picture encoder may select the preset points including the starting point to calculate a matching error of a current block, select one of the preset points with the minimum matching error as a matching point, and write the starting point and a position offset parameter value between the starting point and the matching point into a bitstream. At a decoding end, a video picture decoder parses the bitstream to obtain the starting point and the position offset parameter value between the matching point and the starting point, determines the starting point and the position offset, determines the position of the matching point, and then determines a prediction value of a current decoding block. The position offset parameter between the matching point and the starting point mainly includes a search step size and a moving direction.

Figure 5:
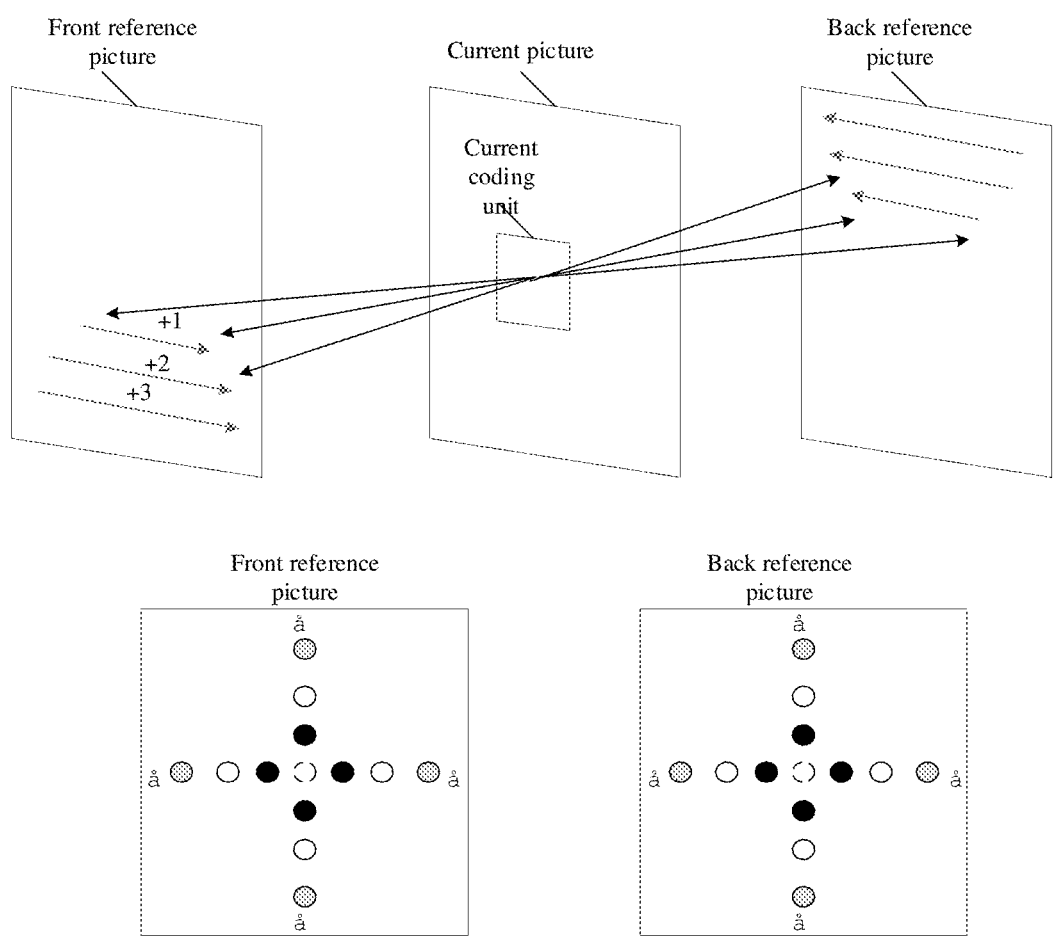
FIG. 5 is a schematic diagram of a principle of MMVD.

First, a candidate motion vector list of a current Coding Unit (CU) is obtained through a Merge candidate list constructing process in VVC. Then, syntax extension as described in (b) is performed for each candidate motion vector in the list: each candidate motion vector is taken as an initial motion vector, searches of 8 different step sizes are performed in four directions of upper, lower, left, and right by taking the position pointed by the initial motion vector in a reference picture as a starting point, as shown in FIG. 5. Each step size of each initial motion vector in each direction forms a new motion vector, and a prediction value of the current coding unit is obtained by performing primary motion compensation through the motion vector. An optimal syntactic element combination is selected by comparing the rate distortion cost among all of the current predicted values, and three syntactic elements of the position of the initial motion vector in the Merge candidate list, the search direction and the index of the search step size are recorded.

Considering the compromise between algorithm complexity and performance, the first two candidate motion vectors of the Merge candidate list are taken as an initial motion vector in the current algorithm. For 8 search step sizes and 4 search directions, index reference is as shown in the following tables.

TABLE 1

| Initial motion vector index | | |
| --- | --- | --- |
| Initial motion vector index | 0 | 1 |
| Position in candidate list | Candidate 1 | Candidate 2 |

TABLE 2

| Search step size index | | | | | | | | |
| --- | --- | --- | --- | --- | --- | --- | --- | --- |
| Step size index | 0 | 1 | 2 | 3 | 4 | 5 | 6 | 7 |
| Pixel distance | 1/4 | 1/2 | 1 | 2 | 4 | 8 | 16 | 32 |

TABLE 3

| Search direction index | | | | |
| --- | --- | --- | --- | --- |
| Direction index | 0 | 1 | 2 | 3 |
| X-axis | + | − | | |
| Y-axis | | | + | − |

The MMVD technique affects an inter prediction part in a video coding hybrid picture, which is specifically applied to a Merge mode and Skip mode part of inter prediction. The MMVD technique acts on a video picture encoder and a video picture decoder simultaneously. The MMVD technique may be used in video coding and decoding chips. The inter prediction is performed by using the multi-directional different-step size MMVD technique, which improves the coding performance.

In the related art, the Merge candidate motion vector in the VVC is reused, and the motion vectors in the first two pieces of candidate motion information of the Merge candidate list are constantly selected as initial motion vectors, so that the phenomenon that the selected two initial motion vectors are too close to each other or even overlapping with each other can be caused.

Figure 6:
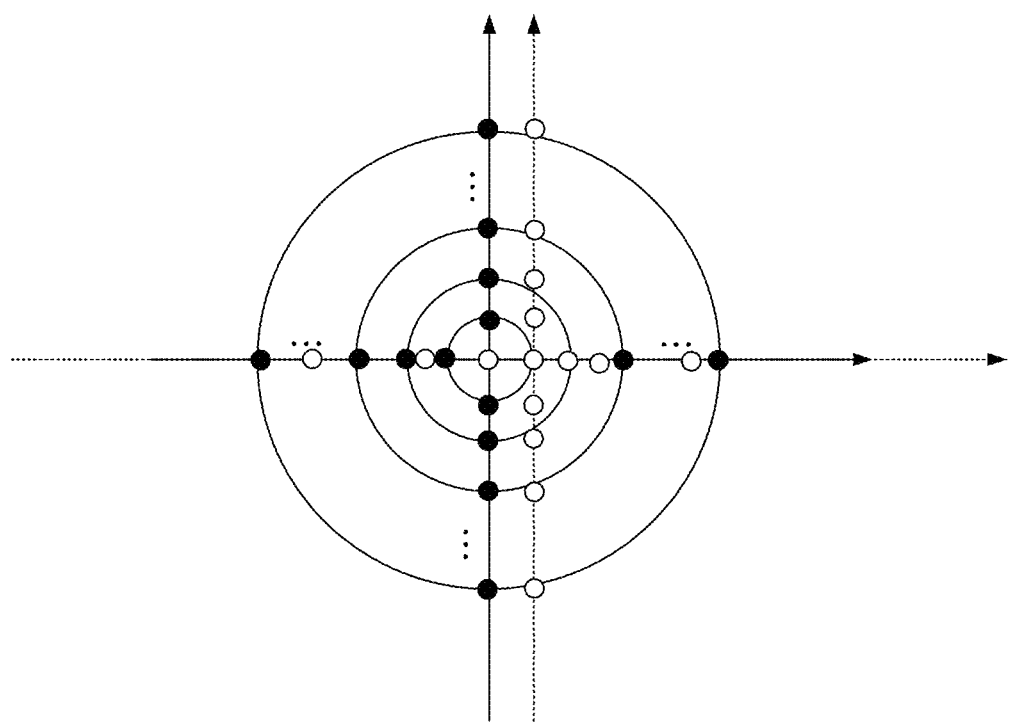
FIG. 6 is a schematic diagram of a motion vector constellation after two initial motion vectors are expanded.

For example, a threshold value range is set to be within a circumference of a circle of ¼ pixel distance by taking a first initial motion vector point as a center of the circle, and if a second initial motion vector point is within the threshold value range or at the boundary of the threshold value range, it is considered to be overlapping with the first initial motion vector point. The search constellation diagram as shown in FIG. 6 is sequentially expanded into the distance by drawings circles by taking the search distance which is increased by multiple as a radius and each of the above-mentioned selected initial motion vector points as a center of a circle. Black chess pieces in FIG. 6 represent the first initial motion vector point and expanded motion vector points corresponding to the first initial motion vector point, and white chess pieces represent the second initial motion vector and extended motion vector points corresponding to the second initial motion vector. It can be seen from FIG. 6 that the second initial motion vector point is exactly at ¼ pixel distance in the horizontal direction of the first initial motion vector point, and the expanded motion vector points of the two initial motion vector points are overlapping in the horizontal direction.

It can be seen that if the distance between the starting points indicated by the two initial motion vectors is too small, the expanded motion vector positions of the second initial motion vector are overlapping with part or all of the expanded motion vector positions of the first initial motion vector, i.e. the second initial motion vector does not provide more valuable candidate motion vector positions, which reduces the coding efficiency in an MMVC mode.

On this basis, an exemplary application of the embodiments of the present disclosure in an actual application scenario will be described below.

In the embodiments of the present disclosure, the candidate check-based MMVD technique is provided. The technology is added with a duplicate checking step when an original MMVD initial point is selected. That is, after the first initial motion vector point is selected, it is judged whether the second candidate motion vector point in the Merge candidate list is within a threshold value range of the first initial motion vector point; if yes, the current candidate motion vector point is skipped, and it is judged whether the next candidate motion vector point is within the threshold value range of the first initial motion vector point until a determination condition is not satisfied, and the current candidate motion vector point which does not satisfy the determination condition is taken as a second initial motion vector point.

That is, in the embodiments of the present disclosure, two candidate motion vectors in the Merge candidate list in the VVC are stilled reused as the initial motion vectors. However, in the embodiments of the present disclosure, it is not limited to selecting the first two candidate motion vectors in the Merge candidate list as initial motion vectors, but determining a second starting point on the basis of taking a first candidate motion vector in the list as a first initial motion vector. If the determination condition is satisfied, it is indicated that the two starting points are too close to each other, then a second starting point is reselected, and subsequent candidate motion vectors in the list are continued to be determined until the determination condition is not satisfied, and the candidate motion vector which does not satisfy the determination condition is taken as a second initial motion vector. For each initial motion vector, three syntactic elements of an original initial motion vector index, a search direction, and a search step size are still used for extended representation.

After the MMVD technique provided by the embodiments of the present disclosure is implemented on VVC reference software VTM 6.0, a test sequence required by JVET is tested under a random access condition, and the result shows that the coding performance is improved.

On the premise of not affecting the coding performance, the embodiments of the present disclosure can achieve the following beneficial effects.

1) The embodiments of the present disclosure can improve the coding performance with the operation times basically unchanged. In the related art, two initial motion vectors are expanded for representation, and are compared for a total of 2*4*8=64 times, herein 2 represents two initial motion vectors, 4 represents a search direction, and 8 represents a search step size. In the embodiments of the present disclosure, still two initial motion vectors are expanded for representation, including 8 search directions and 4 search step sizes, and are compared for a total of 2*8*4=64 times. It can be seen that the embodiments of the present disclosure can improve the overall coding performance while maintaining the same amount of calculation as the related art.

2) The embodiments of the present disclosure can basically keep the complexity of the decoding end unchanged. In the related art, an initial motion vector is expanded for representation by decoding three syntax elements at a decoding end, so as to perform motion compensation to finally obtain a reconstructed block. In the embodiments of the present disclosure, the initial motion vector is expanded for representation by still decoding three syntax elements. The only difference is that, when a second initial motion vector point is selected, an operation of determining whether the second initial motion vector point is within the threshold value range of the first initial motion vector point is added, if yes, the process skips out of the current cycle and begins the judgment of the next candidate motion vector; and in the worst case, the judgment of the threshold value is performed for three times, so the complexity is basically kept unchanged.

In the embodiments of the present disclosure, on the basis of selecting the first initial motion vector point, whether the second initial motion vector point is too close to the first initial motion vector point is checked to avoid overlapping of the obtained expanded motion vectors by taking the two initial motion vector points as starting points.

In other embodiments, a ¼ pixel used to judge whether the distance is too close in the above-mentioned embodiments is changed into other values, for example, a ½ pixel.

In other embodiments, a ¼ pixel used to judge whether the distance is too close in the above-mentioned embodiments is changed into variable values, and the value is transmitted through a newly added syntactic element in a bit stream. For example, a corresponding syntactic element is set in a Sequence Layer Parameter Set (sps) and is used for indicating a distance threshold value for judgment.

In other embodiments, if the second initial motion vector point is too close to the first initial motion vector point, the point may also be subjected to pixel offset of a certain step size in a certain direction on the basis of the second initial motion vector point, so that the two initial motion vector points are located at non-overlapping positions. Thus, the first two candidate motion vectors in the Merge candidate list are still used as initial motion vectors, and only a certain offset adjustment needs to be performed on the second initial motion vector.

In other embodiments, if a plurality of motion vectors in the Merge candidate list are very close to one another, then a new motion vector is constructed as the initial motion vector in this case. The construction of the new motion vector may be realized as follows: an offset of ½ pixel from a first initial motion vector to the direction of a second candidate motion vector direction is selected (or, another value may be selected as the distance threshold value, or a selectable value is transmitted from the bitstream), so as to obtain a new motion vector.

In other embodiments, if there is only one candidate motion vector in the Merge candidate list, then a new motion vector is constructed as the initial motion vector in this case. The construction of the new motion vector may be implemented as follows: an offset of ½ pixel from the candidate motion vector to any direction is selected (or, another value may be selected as the distance threshold value, or a selectable value is transmitted from the bitstream), so as to obtain a new motion vector.

In other embodiments, if a plurality of motion vectors in the Merge candidate list are very close to one another, one of these close motion vectors located near the center of the motion vectors is selected as the first initial motion vector.

In other embodiments, the distance threshold value used to determine whether the distance is too close may be selected based on the size of the current block. For example, if the size of the current block is greater than or equal to 8*8, then ½ pixel is used as the distance threshold value, otherwise 1 pixel is used as the distance threshold value.

In other embodiments, the distance threshold value used to determine whether the distance is too close may also be determined based on the motion vectors of surrounding blocks. For example, a mean value of the vector lengths of the motion vectors of the surrounding blocks (or all motion vectors in the Merge candidate list) is used as the distance threshold.

Based on foregoing embodiments, the embodiments of the present disclosure provide an apparatus for inter prediction. The apparatus includes various modules and units included in the various modules, and may be implemented through a processor in an electronic device, of course, may also be implemented through specific logic circuits. During implementation, the processor may be a Central Processing Unit (CPU), a Microprocessing Unit (MPU), a Digital Signal Processor (DSP), a Field Programmable Gate Array (FPGA), or etc.

Figure 7:
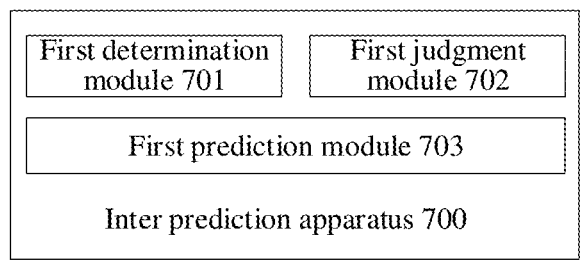
FIG. 7 is a schematic diagram of a composition structure of an apparatus for inter prediction according to the embodiments of the present disclosure.

FIG. 7 is a schematic diagram of composition structures of an apparatus for inter prediction according to the embodiments of the present disclosure. As shown in FIG. 7, the apparatus 700 includes a first determination module 701, a first judgment module 702, and a first prediction module 703.

The first determination module 701 is configured to: determine first motion information and second candidate motion information according to the position of a current block in a video picture. The motion information at least includes motion vectors.

The first judgment module 702 is configured to: judge whether the distance between the motion vector of the first motion information and the motion vector of the second candidate motion information is greater than a first threshold value, when a judgment result indicates that the distance is less than or equal to the first threshold value, update the second candidate motion information to obtain second motion information, and take the second candidate motion information as the second motion information when the judgment result indicates that the distance is greater than the first threshold value.

The first prediction module 703 is configured to: perform inter prediction on the current block by using the first motion information and the second motion information.

In other embodiments, the first determination module 701 is configured to: take a first piece of motion information obtained by a preset motion information derivation method as the first motion information according to the position of the current block in the video picture, and take a second piece of motion information obtained by the preset motion information derivation method as the second candidate motion information.

In other embodiments, the preset motion information derivation method is a motion information derivation method for Merge mode.

In other embodiments, the first judgment module 702 is configured to: judge whether the distance between the position to which the motion vector of the first motion information points and position to which the motion vector of the second motion information points is greater than a first threshold value.

In other embodiments, the Euclidean distance between the two motion vectors is taken as the distance between the two motion vectors, and the two motion vectors are the motion vector of the first motion information and the motion vector of the second candidate motion information respectively.

In other embodiments, a coordinate difference value of the two motion vectors in the horizontal direction and/or the vertical direction is taken as the distance between the two motion vectors.

In other embodiments, the first threshold value is a preset value.

In other embodiments, the preset value is a value represented as a fractional pixel accuracy.

In other embodiments, the preset value is a ½ pixel or a ¼ pixel.

In other embodiments, the first threshold value is a value determined adaptively.

In other embodiments, the first judgment module 702 is further configured to: calculate correlation parameter values between a plurality of motion vectors of adjacent blocks of the current block, and take the distance between the motion vectors corresponding to one of the correlation parameter values representing the maximum correlation between the two motion vectors as the first threshold value.

In other embodiments, the first judgment module 702 is configured to: continue to use the preset motion information derivation method to obtain derived motion information after obtaining the second candidate motion information, and when the distance between the motion vector of the first motion information and the motion vector of the derived motion information is greater than the first threshold value, take the derived motion information as the second motion information.

In other embodiments, the first judgment module 702 is configured to: continue to use the preset motion information derivation method to obtain derived motion information after obtaining the second candidate motion information, and when the distance between the motion vector of the first motion information and the motion vector of any piece of motion information obtained by the preset motion information derivation method is less than or equal to the first threshold value, take a specified piece of derived motion information as the second motion information.

In other embodiments, the first judgment module 702 is configured to: take a motion vector, which intersects a first boundary line, in a direction pointing to the motion vector of the second candidate motion information, as a motion vector of the second motion information. The first boundary line is composed of the points that take a motion vector pointing point of the first motion information as a center point and have the distance equal to the first threshold value from the center point.

In other embodiments, the first judgment module 702 is configured to: take a motion vector pointing to a point having a preset distance from the motion vector of a first candidate motion information as the motion vector of the second motion information.

In other embodiments, the preset distance is a ½ pixel or a ¼ pixel.

In other embodiments, the first prediction module 703 is configured to: select optimal motion information from the candidate motion information indicated by the first motion information and the second motion information, and construct an inter prediction value of the current block by using the optimal motion information.

In other embodiments, the first determination module 701 is configured to: determine the candidate motion information indicated by the first motion information and the second motion information by using an MMVD method.

In other embodiments, the first determination module 701 is configured to: determine the optimal motion information by using a rate distortion optimization method.

In other embodiments, the apparatus 700 further includes a sending module, configured to: code the parameter value for indicating the optimal motion information and write the coded parameter value into a bitstream.

Figure 8:
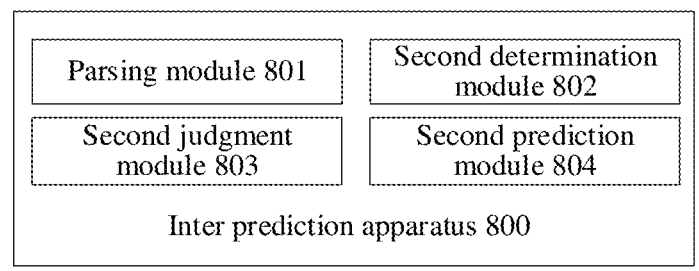
FIG. 8 is a schematic diagram of a composition structure of another apparatus for inter prediction according to the embodiments of the present disclosure.

The embodiments of the present disclosure provide apparatus for inter prediction. FIG. 8 is a schematic diagram of composition structures of the apparatus for inter prediction according to the embodiments of the present disclosure. As shown in FIG. 8, the apparatus 800 includes a parsing module 801, a second determination module 802, and a second judgment module 803, and a second prediction module 804.

The parsing module 801 is configured to: parse a bitstream to obtain the position of a current block in a video picture.

The second determination module 802 is configured to: determine first motion information and second candidate motion information according to the position. The motion information at least includes motion vectors.

The second judgment module 803 is configured to: judge whether the distance between the motion vector of the first motion information and the motion vector of the second candidate motion information is greater than a first threshold value, when a judgment result indicates that the distance is less than or equal to the first threshold value, update the second candidate motion information to obtain second motion information, and take the second candidate motion information as the second motion information when the judgment result indicates that the distance is greater than the first threshold value.

The second prediction module 804 is configured to: construct an inter prediction value of the current block by using the first motion information and the second motion information.

In other embodiments, the second determination module 802 is configured to: take a first piece of motion information obtained by a preset motion information derivation method as the first motion information according to the position, and take a second piece of motion information obtained by the preset motion information derivation method as the second candidate motion information.

In other embodiments, the preset motion information derivation method is a motion information derivation method for Merge mode.

In other embodiments, the second judgment module 803 is configured to: judge whether the distance between the position to which the motion vector of the first motion information points and position to which the motion vector of the second motion information points is greater than a first threshold value.

In other embodiments, the Euclidean distance between the two motion vectors is taken as the distance between the two motion vectors, and the two motion vectors are the motion vector of the first motion information and the motion vector of the second candidate motion information respectively.

In other embodiments, a coordinate difference value of the two motion vectors in the horizontal direction and/or the vertical direction is taken as the distance between the two motion vectors.

In other embodiments, the first threshold value is a preset value.

In other embodiments, the preset value is a value represented as a fractional pixel accuracy.

In other embodiments, the preset value is a ½ pixel or a ¼ pixel.

In other embodiments, the first threshold value is a value determined adaptively.

In other embodiments, the second judgment module 803 is further configured to: calculate correlation parameter values between a plurality of motion vectors of adjacent blocks of the current block, and take the distance between the motion vectors corresponding to one of the correlation parameter values representing the maximum correlation between the two motion vectors as the first threshold value.

In other embodiments, the second judgment module 803 is configured to: continue to use the preset motion information derivation method to obtain derived motion information after obtaining the second candidate motion information, and when the distance between the motion vector of the first motion information and the motion vector of the derived motion information is greater than the first threshold value, take the derived motion information as the second motion information.

In other embodiments, the second judgment module 803 is configured to: continue to use the preset motion information derivation method to obtain derived motion information after obtaining the second candidate motion information, and when the distance between the motion vector of the first motion information and the motion vector of any piece of motion information obtained by the preset motion information derivation method is less than or equal to the first threshold value, take a specified piece of derived motion information as the second motion information.

In other embodiments, the second judgment module 803 is configured to: take a motion vector which intersects a first boundary line in a direction pointing to the motion vector of the second candidate motion information as a motion vector of the second motion information. The first boundary line is composed of points that take a motion vector pointing point of the first motion information as a center point and have the distance equal to the first threshold value from the center point.

In other embodiments, the second judgment module 803 is configured to: take a motion vector pointing to a point having a preset distance from the motion vector of a first candidate motion information as the motion vector of the second motion information.

In other embodiments, the second prediction module 804 is configured to: parse a bitstream to determine a parameter indicating motion information for constructing an inter prediction value of the current block, select a motion vector from the candidate motion information indicated by the first motion information and the second motion information according to parameters of the motion information, calculate correction amount of the motion vector according to the parameters of the motion information, take the sum of the selected motion vector and the correction amount of the motion vector as the motion vector of the current block, and construct the inter prediction value of the current block by using the motion vector of the current block.

In other embodiments, the second determination module 802 is configured to: determine the candidate motion information indicated by the first motion information and the second motion information by using an MMVD method.

The above descriptions about the apparatus embodiments are similar to descriptions about the method embodiments and beneficial effects similar to those of the method embodiments are achieved. Technical details undisclosed in the apparatus embodiments of the present disclosure may be understood with reference to the descriptions about the method embodiments of the present disclosure.

It is to be noted that, in the embodiments of the present disclosure, when implemented in form of a software functional module and sold or used as an independent product, the above-mentioned method for inter prediction may also be stored in a computer readable storage medium. Based on such an understanding, the technical solutions of the embodiments of the present disclosure substantially or parts making contributions to the related art may be embodied in a form of a software product. The computer software product is stored in a storage medium, including a plurality of instructions configured to enable an electronic device (which may be a mobile terminal, a tablet computer, desktop computer, a server, a television, an audio player, etc.) to execute all or part of the method in each embodiment of the present disclosure. The foregoing storage medium includes: various media capable of storing program codes, such as a USB flash drive, a mobile hard disc, a Read-Only Memory (ROM), a magnetic disc, or a compact disc. Therefore, the embodiments of the present disclosure are not limited to any specific hardware and software combination.

Figure 9:
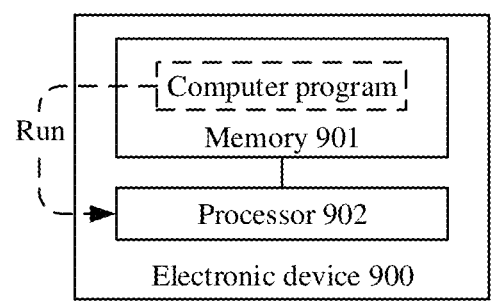
FIG. 9 is a schematic diagram of a hardware entity of an electronic device according to the embodiments of the present disclosure.

Correspondingly, the embodiments of the present disclosure provide an electronic device. FIG. 9 is a schematic diagram of a hardware entity of an electronic device according to the embodiments of the present disclosure. As shown in FIG. 9, the electronic device 900 includes a memory 901 and a processor 902. The memory 901 stores a computer program capable of running in the processor 902. The processor 902 implements the steps in the method for inter prediction provided by the above-mentioned embodiments when executing the program.

It is to be noted that the memory 901 is configured to store instructions and an application executable by the processor 902, may also buffer data (for example, picture data, audio data, audio communication data, and video communication data) to be processed or having been processed by the processor 902 and each module in the electronic device 900, and may be implemented through a flash or a Random Access Memory (RAM).

Correspondingly, the embodiment of the present disclosure provides a computer readable storage medium, which may have a computer program stored thereon. The computer program is executed by a processor to implement the steps of the method for inter prediction provided by the above-mentioned embodiments.

It is to be pointed out that the above descriptions about the storage medium and device embodiments are similar to the descriptions about the method embodiment and beneficial effects similar to those of the method embodiment are achieved. Technical details undisclosed in the storage medium and device embodiments of the present disclosure are understood with reference to the descriptions about the method embodiment of the present disclosure.

It should be understood that "one embodiment" or "an embodiment" mentioned throughout the specification means that specified features, structures, or characteristics related to the embodiment are included in at least one embodiment of this application. Therefore, "in one embodiment" or "in an embodiment" appearing throughout the specification does not necessarily refer to a same embodiment. In addition, these specified features, structures, or characteristics may be combined in one or more embodiments in any appropriate manner. It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of the present disclosure. The sequence numbers of the embodiments of the above-mentioned application are merely for the description, and do not represent the advantages and disadvantages of the embodiments.

It is to be noted that, herein, terms "include" and "contain" or any other variants thereof are intended to cover nonexclusive inclusions, so that, a process, a method, or an apparatus including a series of elements not only includes those elements but also includes other elements which are not clearly listed or further includes intrinsic elements of the process, the method or the apparatus. Under the condition of no more limitations, an element defined by a statement "including a/an . . . " does not exclude existence of additional same elements in the process, the method, or the apparatus.

In several embodiments provided by the present disclosure, it is to be understood that the disclosed device and method may be implemented in other manners. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may be or may not be physically separate, and the parts shown as units may be or may not be physical elements, which may be located in one place or distributed to a plurality of network elements. Part or all of the units may be selected to achieve the objectives of the solutions of the embodiments according to practical requirements.

In addition, each function unit in each embodiment of the present disclosure may be integrated into a processing unit, each unit may also serve as an independent unit and two or more than two units may also be integrated into a unit. The integrated unit may be implemented in a hardware form and may also be implemented in form of hardware and software function unit.

Those of ordinary skill in the art will appreciate that: all or part of the steps of the above-mentioned method embodiments may be completed through hardware associated with program instructions. The foregoing program may be stored in a computer readable storage medium. The steps including the above-mentioned method embodiments are executed when the program is executed. The foregoing storage medium includes various media capable of storing program codes, such as a mobile storage device, a Read Only Memory (ROM), a magnetic disc or a compact disc.

Or, when implemented in form of software function module and sold or used as an independent product, the integrated unit of the present disclosure may also be stored in a computer readable storage medium. Based on such understanding, the technical solutions of the embodiments of the present disclosure substantially or parts making contributions to the related art may be embodied in a form of a software product. The computer software product is stored in a storage medium, including a plurality of instructions configured to enable an electronic device (which may be a mobile terminal, a tablet computer, desktop computer, a server, a television, an audio player, etc.) to execute all or part of the method in each embodiment of the present disclosure. The foregoing storage medium includes: various media capable of storing program codes, such as a mobile storage device, the ROM, a magnetic disc, or a compact disc.

The methods disclosed in some method embodiments provided in the present disclosure may be freely combined without conflicts to obtain new method embodiments.

The characteristics disclosed in several product embodiments provided in the present disclosure may be freely combined without conflicts to obtain new product embodiments.

The characteristics disclosed in several method or device embodiments provided in the present disclosure may be freely combined without conflicts to obtain new method embodiments or device embodiments.

The foregoing descriptions are merely implementation manners of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the protection scope of this application shall be subject to the protection scope of the claims.

In the embodiments of the present disclosure, after the first motion information and the second candidate motion information are determined according to the position of the current block in the video picture, inter prediction on the current block by using the motion information is not performed directly, but it is firstly judged whether the second candidate motion information satisfies a condition first before performing the inter prediction, i.e., it is judged whether the distance between the motion vector of the first motion information and the motion vector of the second candidate motion information is greater than a first threshold value. The second candidate motion information is updated when the judgment result indicates that the distance is less than or equal to the first threshold, so as to obtain the second motion information. The second candidate motion information is taken as the second motion information when the judgment result indicates that the distance is greater than the first threshold value. Based on this, the inter prediction is performed by using the first motion information and the second motion information. Thus, the coding performance is improved with the operation times basically unchanged.

The invention claimed is:

1. A method for inter prediction, applied to a video picture encoder, and comprising:
   determining first motion information and second candidate motion information according to a position of a current block in a video picture, wherein the motion information at least comprises motion vectors;
   judging, with the second candidate motion information pre-determined, whether a distance between a motion vector of the first motion information and a motion vector of the second candidate motion information is greater than a non-zero first threshold value, wherein the distance is determined based on a first position to which the motion vector of the first motion information points and a second position to which the motion vector of the second candidate motion information points;
   when a judgment result indicates that the distance is less than or equal to the first threshold value, obtaining second motion information based on the second candidate motion information; when the judgment result indicates that the distance is greater than the first threshold value, taking the second candidate motion information as the second motion information; and
   performing inter prediction on the current block by using the first motion information and the second motion information.

2. The method of claim 1, wherein the judging whether the distance between the motion vector of the first motion information and the motion vector of the second candidate motion information is greater than the first threshold value comprises:
   judging whether the distance between the first position and a second position is greater than the first threshold value.

3. The method of claim 2, further comprising:
   taking a coordinate difference value of two motion vectors in at least one of a horizontal direction or a vertical direction as the distance between the two motion vectors.

4. The method of claim 2, wherein the first threshold value is a preset value.

5. A method for inter prediction, applied to a video picture decoder, and the method comprising:
   parsing a bitstream to obtain a position of a current block in a video picture;
   determining first motion information and second candidate motion information according to the position, wherein the motion information at least comprises motion vectors;
   judging, with the second candidate motion information pre-determined, whether a distance between the motion vector of the first motion information and the motion vector of the second candidate motion information is greater than a non-zero first threshold value, wherein the distance is determined based on a first position to which the motion vector of the first motion information points and a second position to which the motion vector of the second candidate motion information points;
   when a judgment result indicates that the distance is less than or equal to the first threshold value, obtaining second motion information based on the second candidate motion information; when the judgment result indicates that the distance is greater than the first threshold value, taking the second candidate motion information as the second motion information; and
   constructing an inter prediction value of the current block by using the first motion information and the second motion information.

6. The method of claim 5, wherein the judging whether the distance between the motion vector of the first motion information and the motion vector of the second candidate motion information is greater than the first threshold value comprises:

judging whether the distance between the first position and the second position is greater than the first threshold value.

7. The method of claim 6, further comprising:

taking a coordinate difference value of the two motion vectors in at least one of a horizontal direction or a vertical direction as a distance between the two motion vectors.

8. The method of claim 6, wherein the first threshold value is a preset value.

9. A video picture encoder, comprising:

a memory and a processor, wherein the memory stores a computer program which is runnable on the processor; and the processor is configured to, when executing the program, perform the following:

determine first motion information and second candidate motion information according to a position of a current block in a video picture, wherein the motion information at least comprises motion vectors;

judge, with the second candidate motion information pre-determined, whether a distance between a motion vector of the first motion information and a motion vector of the second candidate motion information is greater than a non-zero first threshold value; when a judgment result indicates that the distance is less than or equal to the first threshold value, obtain second motion information based on the second candidate motion information; when the judgment result indicates that the distance is greater than the first threshold value, take the second candidate motion information as the second motion information, wherein the distance is determined based on a first position to which the motion vector of the first motion information points and a second position to which the motion vector of the second candidate motion information points; and perform inter prediction on the current block by using the first motion information and the second motion information.

10. The video picture encoder of claim 9, wherein in judging whether the distance between the motion vector of the first motion information and the motion vector of the second candidate motion information is greater than the first threshold value, the processor is configured to:

judge whether the distance between the first position and the second position is greater than the first threshold value.

11. The video picture encoder of claim 10, wherein the processor is further configured to:

take a coordinate difference value of two motion vectors in at least one of a horizontal direction or a vertical direction as the distance between the two motion vectors.

12. The video picture encoder of claim 10, wherein the first threshold value is a preset value.

13. A video picture decoder, comprising:

a memory and a processor, wherein the memory stores a computer program which is runnable on the processor; and the processor is configured to, when executing the program, perform the following:

parse a bitstream to obtain a position of a current block in a video picture;

determine first motion information and second candidate motion information according to the position, wherein the motion information at least comprises motion vectors;

judge, with the second candidate motion information pre-determined, whether a distance between the motion vector of the first motion information and the motion vector of the second candidate motion information is greater than a non-zero first threshold value; when a judgment result indicates that the distance is less than or equal to the first threshold value, obtain second motion information based on the second candidate motion information; when the judgment result indicates that the distance is greater than the first threshold value, take the second candidate motion information as the second motion information, wherein the distance is determined based on a first position to which the motion vector of the first motion information points and a second position to which the motion vector of the second candidate motion information points; and construct an inter prediction value of the current block by using the first motion information and the second motion information.

14. The video picture decoder of claim 13, wherein in judging whether the distance between the motion vector of the first motion information and the motion vector of the second candidate motion information is greater than the first threshold value, the processor is configured to:

judge whether the distance between the first position and the second position is greater than the first threshold value.

15. The video picture decoder of claim 14, wherein the processor is further configured to:

take a coordinate difference value of the two motion vectors in at least one of a horizontal direction or a vertical direction as a distance between the two motion vectors.

16. The video picture decoder of claim 14, wherein the first threshold value is a preset value.

* * * * *